UNITED STATES PATENT OFFICE.

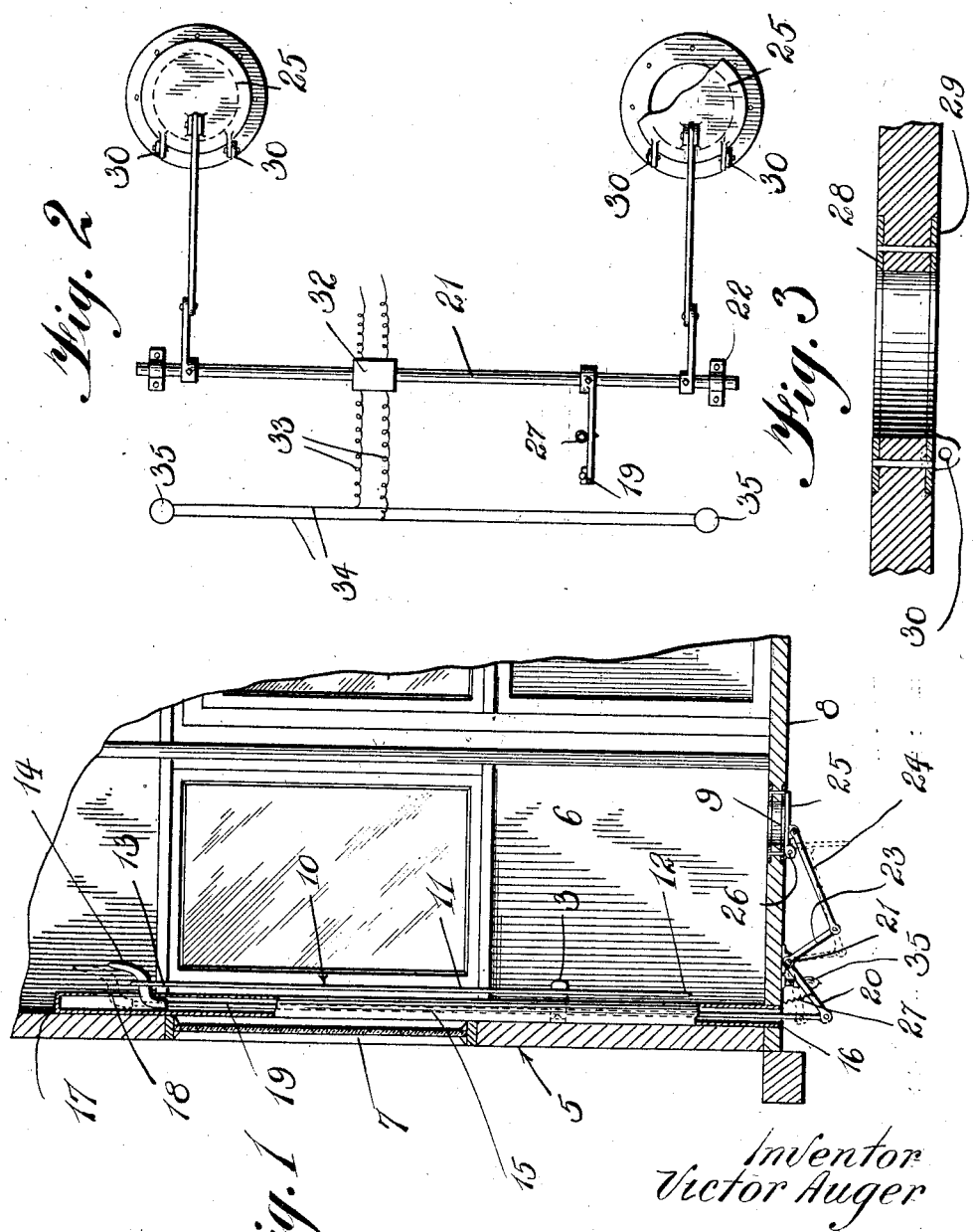

VICTOR AUGER, OF MONTREAL, QUEBEC, CANADA, ASSIGNOR OF ONE-HALF TO ARTHUR FERRON, OF MONTREAL, CANADA.

SUPPORTING DEVICE FOR SWITCH-ACTUATING BARS.

1,378,755. Specification of Letters Patent. Patented May 17, 1921.

Application filed March 19, 1921. Serial No. 453,804.

*To all whom it may concern:*

Be it known that I, VICTOR AUGER, a subject of the King of Great Britain, residing at Montreal, Province of Quebec, Canada, have invented certain new and useful Improvements in Supporting Devices for Switch-Actuating Bars; and I do hereby declare that the following is a full, clear, and exact description of the invention, such as will enable others skilled in the art to which it appertains to make and use the same.

The present invention relates to new and useful improvements in supporting devices for switch actuating bars or rods used on street railway cars and the like.

The primary object of the invention is the provision of an apparatus such as above referred to which includes means for supporting the switch actuating bar within the car and within the convenient reach of the operator.

Another object of the invention is the provision of means for supporting the switch actuating bar and also means for closing the usual openings formed in the floor of the car through which the said bar is extended for engaging the switch points.

A still further object of the invention is the provision of means for closing the openings in the bottom of a car through which the switch bar is projected for use, together with means for supporting said bar within the car when not in use.

Still another object of the invention is the provision in a device such as above described of reinforcing means for reinforcing the openings in the bottom of a car through which the switch actuating bar is projected for use.

A further object of the invention is the provision in a device such as above described of means for closing the openings through which the switch actuating bar is projected for use, together with means for supporting the switch bar when not in use, so arranged that when the switch actuating bar is suspended from its support, the openings will be closed, but when the switch actuating bar is removed from its support, the said openings will be open permitting the projection of the switch bar therethrough for use.

A further object of the invention is the provision of means for automatically lighting lights beneath the car adjacent the switch points when the switch actuating bar is removed from its support.

A still further object of the invention is the provision of a switch actuating bar support such as above referred to, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawing forming a part of the present application, and in which:

Figure 1 is a sectional view taken through a portion of a street railway car showing the invention applied thereto;

Fig. 2 is a bottom plan view of the device; and,

Fig. 3 is a detail sectional view taken through the reinforcing plates of one of the openings in the bottom of the car.

Referring now to the accompanying drawing by corresponding characters of reference, the numeral 5 designates a portion of a street railway car which comprises the usual side walls 6, front wall 7, and floor or bottom 8, the latter of which is provided with openings 9 through which a switch actuating bar 10 can be extended for engagement with the usual switch points of the rails for throwing them open or to closed positions.

This bar 10 comprises the usual body portion 11 tapered at one end as at 12 for insertion between the switch points and being provided at its opposite end with an eye 13 which serves as a handle and also for the purpose of suspending the same from the hook designated in the present instance by the numeral 14. A tubular casing 15 is placed at a convenient point within the car and extends through the bottom thereof as shown at 16. The upper end is closed at 17 and is provided in one side with a slot 18 through which the hook 14 projects.

The hook 14 is rigidly secured to a vertical rod 19 which extends through the tube 15 and through the opening 16 in the lower end thereof at which point it is pivotally connected to a forwardly extending arm 20 which is carried by a rotatable rod 21 journaled in suitable bearings 22 secured to the underside of the bottom 8.

Rearwardly extending arms 23 are secured to the rod 21 and are attached to links 24 which are connected to the closures 25 pivoted as at 26 to the underside of the bottom 8 for the purpose of normally closing the openings 9.

A spring shown at 27 is attached to the arm 20 and likewise to the bottom 8, serving to normally force the arm 20 upwardly and the closure 25 to the open or dotted line position shown in Fig. 1.

Reinforcing plates 28 and 29 are countersunk at the opposite sides of the openings 9 for preventing the edges of the openings from becoming broken or worn by the projection of the switch actuating bar 10 therethrough. The plate 29 is provided with ears 30 to which the before described closures 25 are pivotally connected.

As the weight of the bar 10 is greater than the tension of the spring 27, when the said bar is placed upon the hook 14, the closures 25 will be forced to their closing positions, but when the said bar 10 is removed from the hook the spring 27 will immediately raise the arm 20 drawing the closures 25 to the dotted line or open position shown in Fig. 1, thus permitting the easy and ready projection of the bar 10 through the openings for the purpose of manually throwing the switch points.

Upon the return of the bar 10 to the hook, these openings will be closed by the weight of said bar acting upon the closures 25.

A spring clip shown at 31 may be also secured to the sleeve 15 if desired, for the purpose of preventing any undesired movement of the bar 10 when in inoperative position, caused by the swaying of the car.

As clearly shown in Fig. 2 of the drawing, a suitable switch is indicated by the numeral 32, and serves to close a circuit through the conductors 33 and 34 which supply current to the lamps 35 (from any suitable source of current supply not shown) which are placed beneath the car in order to throw light upon the switch points for use of the operator at night.

From the foregoing description, taken in connection with the accompanying drawing, it will be manifest that a supporting device for switch actuating bars is provided which will fulfil all of the necessary requirements of such an apparatus, and it should be understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. The combination with a street railway car or the like having openings in the lower side thereof, a hook within the car for supporting the switch actuating bar, closures for the openings, and an operative connection between the closures and said hook, substantially as and for the purposes set forth.

2. In a device of the character described, the combination with a street railway car or the like having openings in the bottom thereof, reinforcing plates upon opposite sides of the openings, closures for said openings, a hook for supporting a switch actuating bar or the like, and an operative connection between the hook and said closures.

3. The combination with a street railway car or the like of a slidably mounted hook, said car having openings in the bottom thereof, closures for said openings, and an operative connection between the closures and the slidably mounted hook, substantially as and for the purposes set forth.

4. The combination with a street railway car or the like having openings in the bottom thereof, closures for said openings, a sleeve disposed within the car, a hook slidably mounted in said sleeve for supporting a switch actuating bar or the like, and an operative connection between the hook and the closures, as and for the purposes set forth.

5. The combination with a street railway car or the like having openings in the bottom thereof, closures for said openings, a sleeve, a hook slidable within the sleeve for supporting a switch actuating bar, a rod attached to the hook and extending through said bar, and an operative connection between the rod and the closures, as and for the purposes set forth.

6. The combination with a street railway car or the like having openings therein, pivoted closures for said openings, a sleeve within the car, a rod slidable within the sleeve, a hook carried by the rod and extending through a slot in the sleeve for vertical sliding movement and for receiving a switch actuating bar or the like, an operative connection between the rod and the closures, the weight of the bar upon said hook forcing said closures to closed position, and a spring attached to the connecting means between the rod and closures for forcing the closures to open position upon the removal of the switch actuating bar from said hook.

7. The combination with a street railway car or the like having openings therein, reinforcing plates for said openings, closures for said openings pivotally connected to one of the plates, a sleeve mounted within the car, a rod having vertical movement within the sleeve, a hook attached to the rod and extending through a slot formed in the sleeve for vertical movement, a rotatable rod, an arm connecting the rotatable rod with the vertically movable arm, a spring attached to the arm and imparting an upward tension thereon, arms extending from the rotatable rod, links connecting said arms and said closures, and a clip attached to the sleeve for engagement with the switch actuating bar or the like suspended from the hook, substantially as and for the purposes set forth.

In witness whereof I have hereunto set my hand.

VICTOR AUGER.